(12) United States Patent
Park et al.

(10) Patent No.: US 7,456,561 B2
(45) Date of Patent: Nov. 25, 2008

(54) PLATE-TYPE FLUORESCENT LAMP AND DISPLAY DEVICE HAVING THE SAME

(75) Inventors: Hae-il Park, Seoul (KR); Jin-seob Byun, Seoul (KR); Sang-yu Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 340 days.

(21) Appl. No.: 11/455,381

(22) Filed: Jun. 19, 2006

(65) Prior Publication Data

US 2007/0004195 A1    Jan. 4, 2007

(30) Foreign Application Priority Data

Jun. 30, 2005    (KR) .................. 10-2005-0057614

(51) Int. Cl.
*H01J 1/62*    (2006.01)

(52) U.S. Cl. ...................... 313/491; 313/594

(58) Field of Classification Search .......... 313/491, 313/594, 607, 635

See application file for complete search history.

(56) References Cited

FOREIGN PATENT DOCUMENTS

| | | |
|---|---|---|
| JP | 2004-241189 | 8/2004 |
| KR | 2002-0072260 | 9/2002 |
| KR | 2002-0053893 | 6/2004 |

*Primary Examiner*—Vip Patel
(74) *Attorney, Agent, or Firm*—Cantor Colburn LLP (57) ABSTRACT

An exemplary embodiment of a plate-type fluorescent lamp and a display device having the same includes an upper glass substrate; a lower glass substrate adhering opposite to the upper glass substrate; electrodes formed on external surfaces of the upper glass substrate and the lower glass substrate; and a dielectric layer formed between one of the upper and lower glass substrates and the electrodes. The dielectric layer is formed between at least one of the glass substrates and the electrodes so as to reduce generating a pinhole.

18 Claims, 8 Drawing Sheets

PLATE-TYPE FLUORESCENT LAMP AND DISPLAY DEVICE HAVING THE SAME

This application claims priority to Korean Patent Application No. 2005-0057614, filed on Jun. 30, 2005 and all the benefits accruing therefrom under 35 U.S.C. §119, and the contents of which in its entirety are herein incorporated by reference.

BACKGROUND OF THE INVENTION

1. Field of the Invention

The present invention relates, in general, to a plate-type fluorescent lamp and a display device having the same and, more particularly, to a plate-type fluorescent lamp and a display device having the same in which a dielectric layer is formed between a glass substrate and an electrode so as to reduce generating a pinhole.

2. Description of the Related Art

Recently, a flat panel display device, such as a liquid crystal display ("LCD"), a plasma display panel ("PDP") or an organic light emitting diode ("OLED"), has been developed to replace a cathode ray tube ("CRT").

The LCD includes an LCD panel having a thin film transistor ("TFT") substrate, a color filter substrate and liquid crystals interposed between the two substrates. Since the LCD does not emit light by itself, the LCD includes a backlight unit disposed in a rear of the TFT substrate for providing light. A transmittance of the light from the backlight unit is controlled depending on an arrangement of the liquid crystals. The LCD panel and the backlight unit are contained in a chassis.

The backlight unit may either be an edge-type or a direct-type depending on a position of the light source part. The edge-type provides a light source like a cold cathode fluorescent lamp ("CCFL"), or the like, at a lateral side of a light guiding plate and a light concentrating sheet/diffusion sheet on the top of the light guiding plate. The direct-type provides a plurality of light sources behind the LCD panel and the light concentrating sheet/diffusion sheet between the light source and the LCD panel. However, the aforementioned backlight unit types are suitable for small and medium LCDs, such as those used in monitors and notebook computers, but are not suitable for large LCDs, such as those used in television monitors, due to problems of weight, thickness, electric power consumption, or the like.

A plate-type fluorescent lamp has been developed, as a light source suitable for a large LCD. A plate-type external electrode fluorescent lamp ("EEFL") employs the principle of an EEFL in two-dimensions (2-D). The plate-type EEFL includes an upper substrate and a lower substrate, which form a light emitting space. Electrodes are formed on external surfaces of the upper substrate and the lower substrate. Both substrates include glass substrates, wherein the upper glass substrate is thinner than the lower glass substrate so as to simplify a manufacturing process of the plate-type EEFL, maintain a vacuum, assure a discharge space, and reduce weight.

When the plate-type EEFL is driven, the upper substrate has more capacity than in the lower substrate because the upper glass substrate is formed thinner than the lower glass substrate. Likewise, when an electric current flows into the upper substrate where capacity is largely formed, intense joule heating is generated and concentrated in the upper substrate.

The joule heating concentrated in the upper substrate makes the upper substrate rise in temperature, thereby generating a pinhole in the electrode and the upper glass substrate.

BRIEF SUMMARY OF THE INVENTION

Accordingly, in exemplary embodiments of the present invention, a plate-type fluorescent lamp and a display device having the same reduce generation of a pinhole.

An exemplary embodiment of a plate-type fluorescent lamp includes an upper glass substrate; a lower glass substrate adhering opposite to the upper glass substrate; electrodes formed on external surfaces of the upper glass substrate and the lower glass substrate; and a dielectric layer formed between the glass substrates and the electrodes.

The upper glass substrate is thinner than the lower glass substrate and the dielectric layer is formed between the upper glass substrate and the electrodes.

The dielectric layer comprises at least one selected from the group consisting of alumina, silica and frit.

A thickness of the dielectric layer is between about 15 μm and about 40 μm.

The upper glass substrate is in a shape of a plurality of half cylinders disposed side by side.

The upper glass substrate is in a rectangular shape and the electrode is formed along opposing sides of the upper glass substrate.

The electrode is formed along shorter sides defining the upper glass substrate.

The dielectric layer extends from an end portion of the electrode to about 20% to about a 40% length of the electrode.

The dielectric layer is formed by a spray method.

The upper glass substrate and the lower glass substrate are in a plate type and the plate-type fluorescent lamp further includes a wall to maintain a distance between the upper glass substrate and the lower glass substrate.

The plate-type fluorescent lamp further includes a light emitting gas sealed between the upper glass substrate and the lower glass substrate.

An exemplary embodiment of a display apparatus including a display panel; and a plate-type fluorescent lamp includes an upper glass substrate facing the display panel, a lower glass substrate adhering to the upper glass substrate, electrodes formed on external surfaces of the upper glass substrate and the lower glass substrate, and a dielectric layer formed between the glass substrate and the electrodes.

The upper glass substrate is thinner than the lower glass substrate and the dielectric layer is formed between the upper glass substrate and the electrode.

The dielectric layer comprises at least one selected from the group consisting of alumina, silica and frit.

A thickness of the dielectric layer is between about 15 μm and about 40 μm.

The upper glass substrate is in a shape of a plurality of half-cylinders disposed side by side.

The upper glass substrate is in a rectangular shape and the electrode is formed on opposing sides of the upper glass substrate facing each other.

The display device further includes a driving PCB adhering to one side of the LCD panel, wherein the dielectric layer extends from an end portion of the electrode adjacent to the driving PCB to about 20% to about 40% of a length of the electrode.

DETAILED DESCRIPTION OF THE INVENTION

The exemplary embodiments of the present invention will now be described with reference to the attached drawings. The present invention may, however, be embodied in different forms and thus the present invention should not be construed as being limited to the exemplary embodiments set forth herein. Rather, these exemplary embodiments are provided so that this disclosure will be thorough and complete, and will fully convey the scope of the invention to those skilled in the art.

In the drawings, the thickness of the layers, films, and regions are exaggerated for clarity. When an element such as a layer, film, region, or substrate is referred to as being "on" another element, it can be directly on the other element or intervening elements may also be present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the exemplary embodiments, an LCD is described as an example of a display device, but a plate-type fluorescent lamp may be used as a light source in other type of display device.

Figure 1:
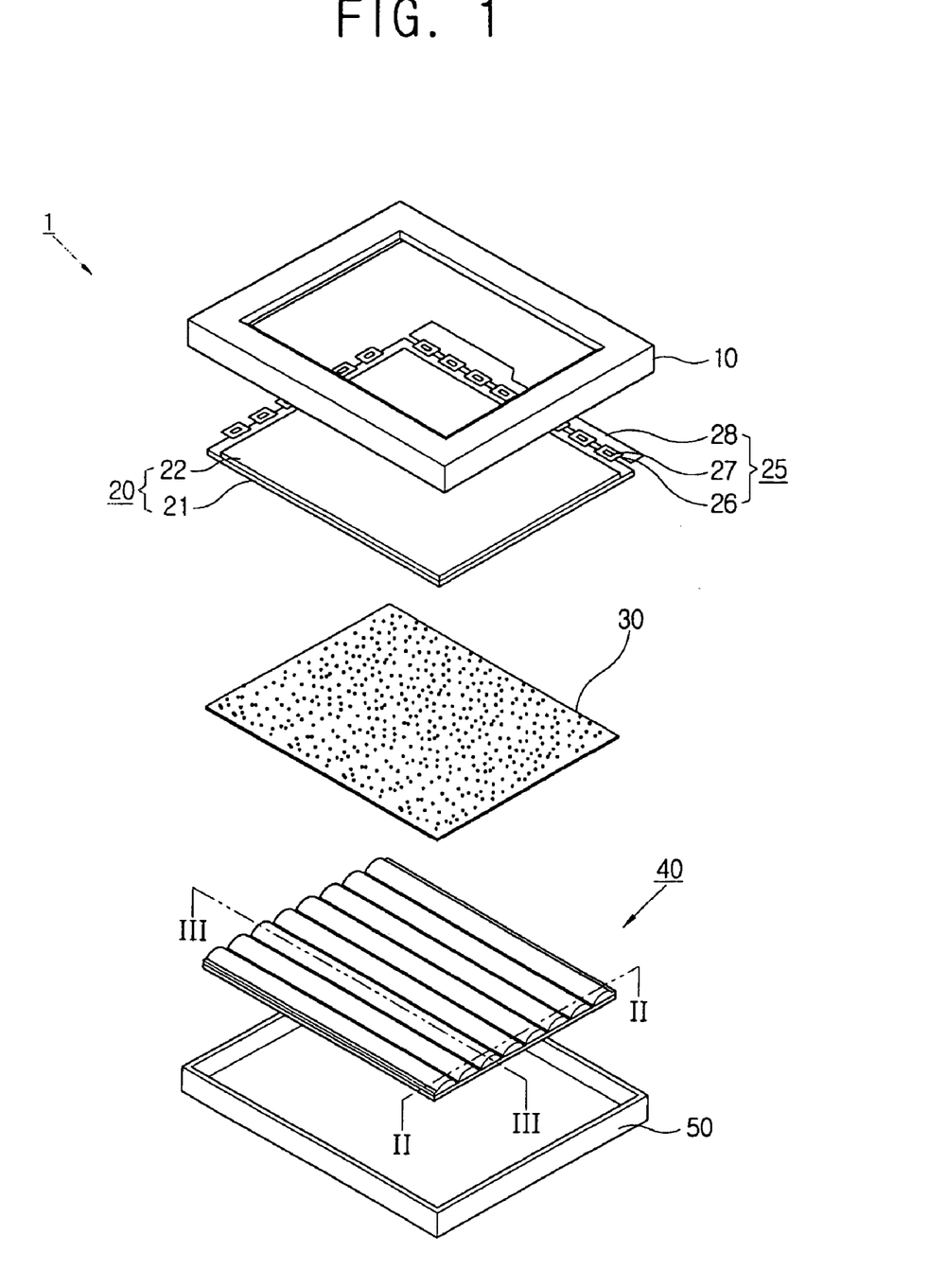
FIG. 1 is an exploded perspective view of an LCD comprising a first exemplary embodiment of a plate-type fluorescent lamp according to the present invention.
Figure 2:
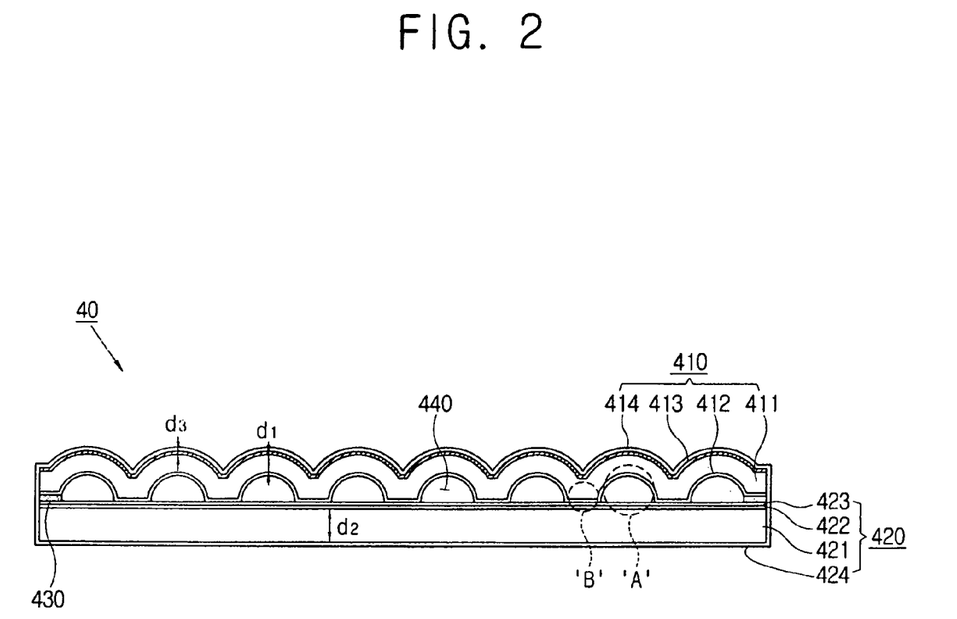
FIG. 2 is a cross-sectional view of the plate-type fluorescent lamp, taken along line II-II of FIG. 1, according to the present invention.
Figure 3:
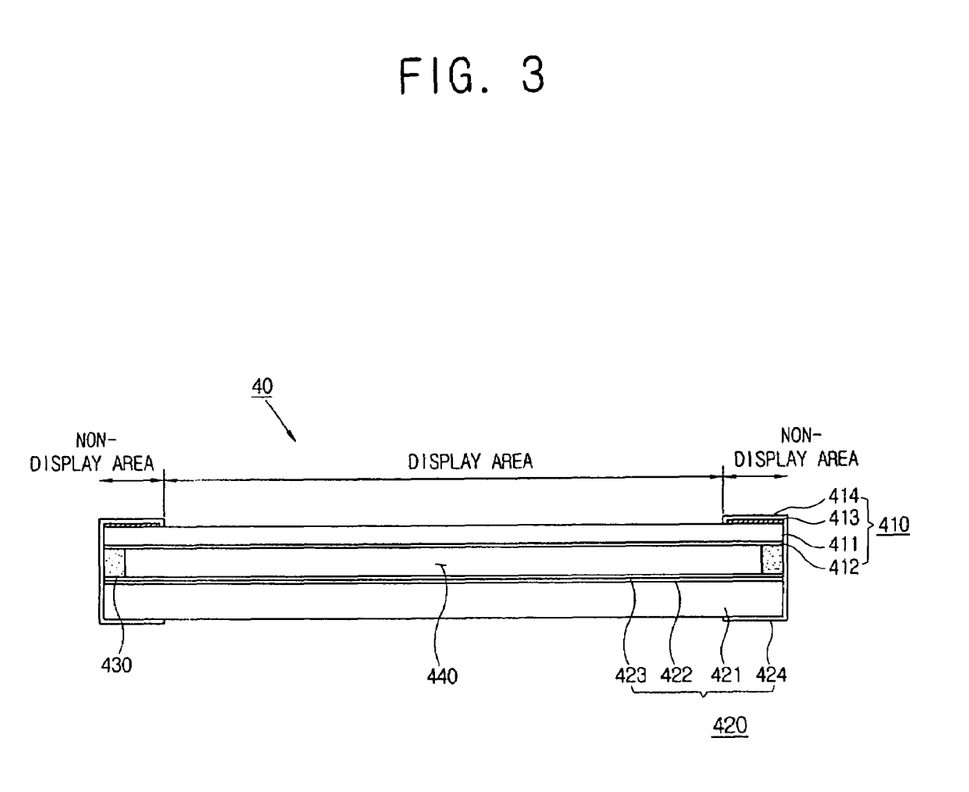
FIG. 3 is a cross-sectional view of the plate-type fluorescent lamp, taken along line III-III of FIG. 1, according to the present invention.

FIG. 1 is an exploded perspective view of an LCD comprising a first exemplary embodiment of a plate-type fluorescent lamp according to the present invention. FIG. 2 is a cross-sectional view of the plate-type fluorescent lamp, taken along line II-II of FIG. 1. FIG. 3 is a cross-sectional view of the plate-type fluorescent lamp, taken along line III-III of FIG. 1.

An LCD 1 includes an LCD panel 20, an optical film 30 disposed in the rear of the LCD panel 20 and a plate-type fluorescent lamp 40 providing light to the optical film 30. The LCD panel 20, the optical film 30 and the plate-type fluorescent lamp 40 are accommodated in an upper chassis 10 and a lower chassis 50.

The LCD panel 20 includes a TFT substrate 21 on which TFTs are formed and a color filter substrate 22 facing the TFT substrate 21. Since the LCD panel 20 does not emit light by itself, the LCD panel 20 is provided with light from the plate-type fluorescent lamp 40 disposed in the rear thereof. A driving part 25 to apply a driving signal is disposed on a side of the TFT substrate 21. The driving part 25 includes a flexible printed circuit ("FPC") 26, a driving chip 27 mounted on the FPC 26 and a driving printed circuit board ("PCB") 28 connected to one side of the FPC 26. The driving part 25 is formed in a chip on film ("COF") type in the exemplary embodiments of the present invention. However, the driving part 25 may be formed of any well-known types, such as a tape carrier package ("TCP"), a chip on glass ("COG") or the like.

The optical film 30 disposed in the rear of the LCD panel 20 includes a base film and a bead layer coated on the base film. The optical film 30 diffuses light from the plate-type fluorescent lamp 40 and provides the diffused light to the LCD panel 20. Since there is no light emitting gas in the plate-type fluorescent lamp 40, a portion B (FIG. 2) thereof indicates where light is not generated. Therefore, if the optical film 30 is absent, a dark line is generated on a screen.

The optical film 30 may further include a prism film, a reflecting-polarizing film and a protecting film.

The plate-type fluorescent lamp 40 includes an upper substrate 410 and a lower substrate 420 to form a light emitting space 440 by adhering to each other. The light emitting space 440 is filled with a light emitting gas composed of mercury/neon, for example, but is not limited thereto.

The upper substrate 410 includes an upper glass substrate 411, an upper light emitting layer 412 formed on an inner surface of the upper glass substrate 411, and a dielectric layer 413 and an upper electrode 414 which are formed on an outer surface of the upper substrate 411.

The upper glass substrate 411 is a formed glass and is formed in a wave shape, as a plurality of half cylinders disposed side by side. The upper glass substrate 410 includes an upward convex part A (FIG. 2) to form the light emitting space 440 and a flat part B to maintain a vacuum and to adhere to the lower substrate 420.

The upper light emitting layer 412 is formed on the entire inner surface of the upper glass substrate 411 to convert ultraviolet rays generated from the light emitting gas into visual rays.

The dielectric layer 413 is formed on a portion of the outer surface of the upper glass substrate 411. The dielectric layer 413 is formed along shorter sides defining the substantially rectangularly shaped upper glass substrate 411. The dielectric layer 413 is comprised of alumina, silica or frit and is between about 15 μm and 40 μm in thickness. The dielectric layer 413 is formed by a spray method, a chemical vapor deposition ("CVD") method or the like.

An upper electrode 414 is formed on the dielectric layer 413. The upper electrode 414 covers the dielectric layer 413. However, a portion of the dielectric layer 413 may not be covered with the upper electrode 414, apart from the exemplary embodiments. The upper electrode 414 is made of a material having excellent conductivity, such as aluminum, nickel or silver, for example. The upper electrode 414 is formed along shorter sides of the rectangularly shaped upper glass substrate 411, as well. Since the upper electrode 414 is non-transmissive, light is not provided to where the upper electrode 414 is formed, which is a non-display area of the LCD panel 20.

The lower substrate 420 includes a lower glass substrate 421, a reflective substrate 422 and a lower fluorescent layer 423 which are formed on an inner surface of the lower glass substrate, and a lower electrode 424 formed on an outer surface of the lower glass substrate 421.

The lower glass substrate 421 is in a plate shape, spaced apart from the upper glass substrate 411. A thickness d2 of the lower glass substrate 421 is larger than a thickness d1 of the upper substrate 411. For example, the thickness d2 of the lower glass substrate 421 is about 1.1 mm and the thickness d1 of the upper glass substrate 411 is about 0.7 mm.

The reflective layer 422 reflects light generated in the light emitting space 440 and leads the light to the LCD panel 20. The lower fluorescent layer 423 is formed on the reflective layer 422.

The lower electrode 424 is formed on a portion of the outer surface of the lower glass substrate 421 to correspond to the upper electrode 414.

The upper substrate 410 and the lower substrate 420 adhere to each other through an adhering part 430. The adhering part 430 is made of frit. Frit is powdery glass for adhesion and is comprised of $SiO_2$, $TiO_2$, $PhO$, $PbTiO_3$, $Al_2O_3$, for example, but is not limited thereto.

Hereinafter, the dielectric layer 413 disposed on the upper substrate 410 is described with regard to its function.

As described above, the thickness d1 of the upper glass substrate 411 is smaller than the thickness d2 of the lower glass substrate 421. That is why the upper glass substrate 411 is manufactured by a glass forming and the thin glass should be used to be easily and efficiently formed. Further, the thicker the upper glass substrate 411 becomes, the heavier the LCD 1 becomes.

Capacity (C) is defined as follows.

$$C = \varepsilon \frac{A}{d} \qquad \langle \text{Formula 1} \rangle$$

Here, capacity is represented in that $\in$ is a dielectric constant; A is an area; and d is a thickness.

The upper substrate 410 is formed having more capacity than in the lower substrate 420 since the upper glass substrate 411 has a wider area than the lower glass substrate 421 due to the wave shape, although being thinner than the lower glass substrate 421.

Meanwhile, impedance is defined as follows.

$$|Z| = \sqrt{R^2 + \left(\frac{1}{2\pi f C}\right)^2} \qquad \langle \text{Formula 2} \rangle$$

Here, R is resistance and f is frequency of electric power.

Formula 2 shows that impedance is in inverse proportion to capacity. Therefore, impedance becomes less in the upper substrate 410 having large capacity as compared with the lower substrate 420, thereby allowing more electric current to flow in the upper substrate 410 than the lower substrate 420 under the same voltage. Accordingly, joule heating is intensively generated in the upper substrate 410, thereby forming a pinhole in the upper glass substrate 411 and/or the upper electrode 414.

According to the first exemplary embodiment of the present invention, the dielectric layer 413 is formed between the upper glass substrate 411 and the upper electrode 414.

When two capacities $C_1$, $C_2$ are directly connected to each other, total capacity $C_{total}$ is expressed as follows.

$$\frac{1}{C_{total}} = \frac{1}{C_1} + \frac{1}{C_2} \qquad \langle \text{Formula 3} \rangle$$

Hereby, it shows that the capacity of the upper substrate 410 considering the upper glass substrate 411 and the dielectric layer 413 is less than capacity of the upper glass substrate 411 or capacity of the dielectric layer 413. Namely, the capacity of the upper substrate 410 decreases and the impedance increases. Accordingly, the electric current concentrated on the upper substrate 410 is dispersed to the lower substrate 420, thereby reducing formation of a pinhole in the upper substrate 410. The lower substrate 420 has a thicker lower glass substrate 421, therefore the lower substrate 420 efficiently controls generation of a pinhole. Further, it is easy to control a rise in temperature of the lower substrate 420, since an additional radiating plate is mounted therein.

Continuing, the following refers to experimental data.

Table 1 shows an electric current and an electric current density of the upper substrate 410 and the lower substrate 420 in a case without the dielectric layer 413. Table 2 shows an electric current and an electric current density of the upper substrate 410 and the lower substrate 420 in a case with the dielectric layer 413. The dielectric layer 413 is coated with $Al_2O_3$ and has a thickness of 20 μm. The upper glass substrate 411 is 0.7 mm thick and the lower glass substrate 412 is 1.1 mm thick. The electric current density is obtained by dividing the electric current by an area of an electrode. The upper electrode 414 has an area of 1.6 $cm^2$ and the lower electrode 424 has an area of 1.3 $cm^2$.

TABLE 1

In a case without dielectric layer

| Input current (A) | Upper substrate current (mA) | Lower substrate current (mA) | Upper substrate current/ Lower substrate current | Upper substrate current density (mA/$cm^2$) | Lower substrate current density (mA/$cm^2$) | Upper substrate current density/ Lower substrate current density |
|---|---|---|---|---|---|---|
| 0.81 | 64.8 | 28.9 | 2.24 | 39.3 | 22.2 | 1.7 |
| 0.85 | 67.9 | 30.3 | 2.24 | 40.2 | 23.3 | 1.7 |
| 0.90 | 71.8 | 32.1 | 2.24 | 42.5 | 24.7 | 1.7 |
| 0.95 | 75.9 | 33.9 | 2.24 | 44.9 | 26.1 | 1.7 |
| 1.00 | 80.2 | 35.7 | 2.25 | 47.5 | 27.5 | 1.7 |
| 1.05 | 84.2 | 67.6 | 2.24 | 49.8 | 28.9 | 1.7 |
| 1.10 | 88.5 | 39.3 | 2.25 | 52.4 | 30.2 | 1.7 |
| 1.15 | 92.4 | 41.2 | 2.24 | 54.7 | 31.7 | 1.7 |
| 1.20 | 96.3 | 42.9 | 2.24 | 57.0 | 33.0 | 1.7 |

TABLE 2

In a case with dielectric layer

| Input current (A) | Upper substrate current (mA) | Lower substrate current (mA) | Upper substrate current/ Lower substrate current | Upper substrate current density (mA/$cm^2$) | Lower substrate current density (mA/$cm^2$) | Upper substrate current density/ Lower substrate current density |
|---|---|---|---|---|---|---|
| 0.80 | 62.1 | 31.2 | 1.99 | 36.8 | 24.0 | 1.5 |
| 0.85 | 66.3 | 33.5 | 1.98 | 39.2 | 25.8 | 1.5 |
| 0.90 | 70.7 | 35.6 | 1.98 | 41.8 | 27.4 | 1.5 |
| 0.95 | 74.9 | 37.8 | 1.98 | 44.3 | 29.0 | 1.5 |
| 1.00 | 79.2 | 40.0 | 1.98 | 46.9 | 30.7 | 1.5 |
| 1.05 | 84.3 | 42.4 | 1.99 | 49.9 | 32.6 | 1.5 |
| 1.10 | 89.1 | 44.8 | 1.99 | 52.7 | 34.5 | 1.5 |
| 1.14 | 93.7 | 47.0 | 1.99 | 55.5 | 36.1 | 1.5 |

Tables 1 and 2 show that the electric current concentrated on the upper substrate 410 is considerably dispersed compared to the lower substrate and the joule heating is reduced in the upper substrate 410 when the dielectric layer 413 is formed.

When the plate-type fluorescent lamp starts to be driven, a higher driving electric current than a usual driving electric current is applied in order to reduce brightness saturation time. For this situation, the electric current to start formation of the pinhole in the upper substrate 410 should be high. That is, the electric current to possibly be applied to the upper substrate 410 should also be high. The dielectric layer 413 formed between the upper glass substrate 411 and the upper electrode 414 increases the electric current required to start formation of the pinhole.

Figure 4:
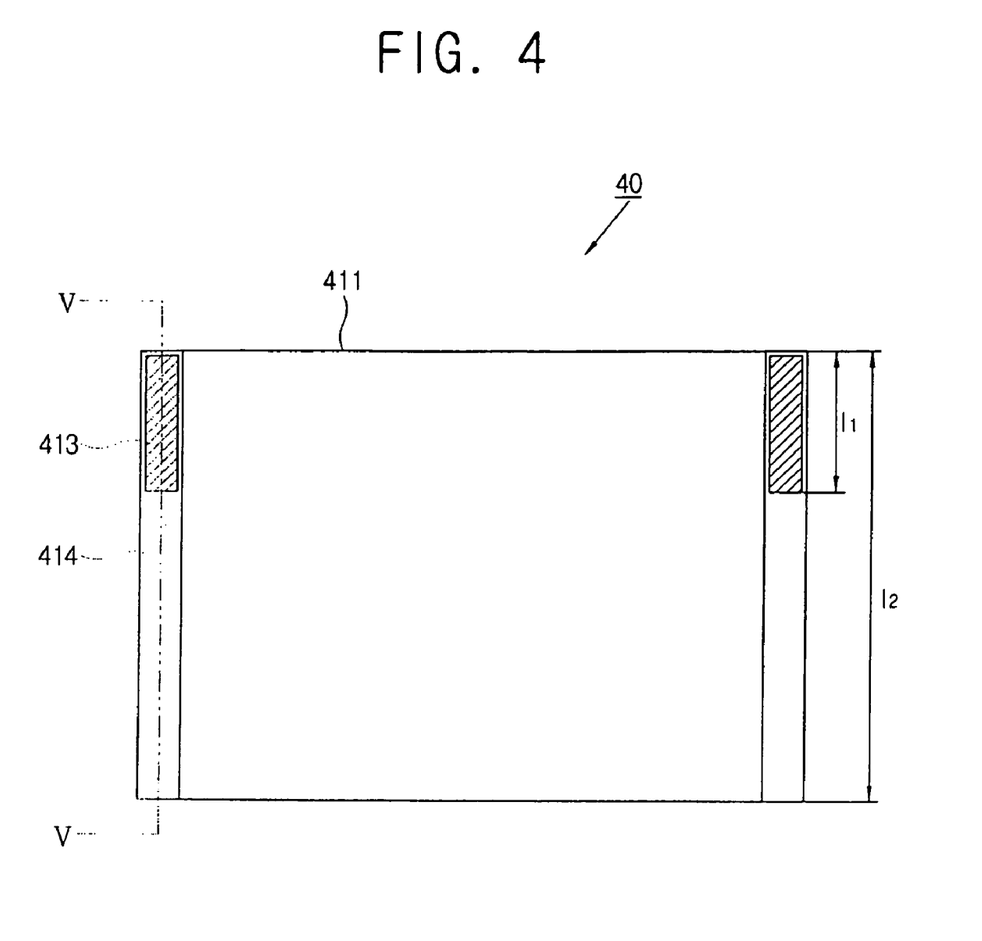
FIG. 4 is a plan view of a second exemplary embodiment of a plate-type fluorescent lamp according to the present invention.
Figure 5A:
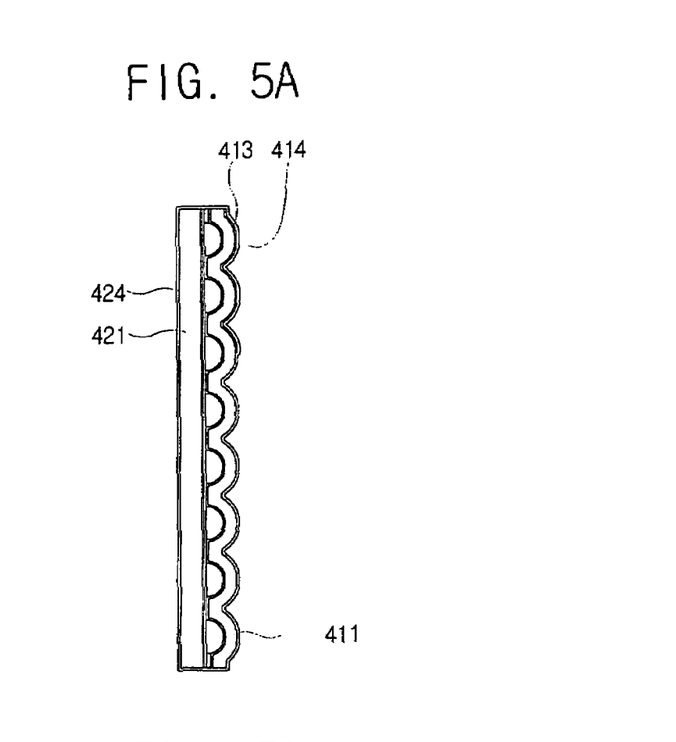
FIG. 5A is a cross-sectional view of the plate-type fluorescent lamp, taken along line V-V of FIG. 4, according to the present invention.
Figure 5B:
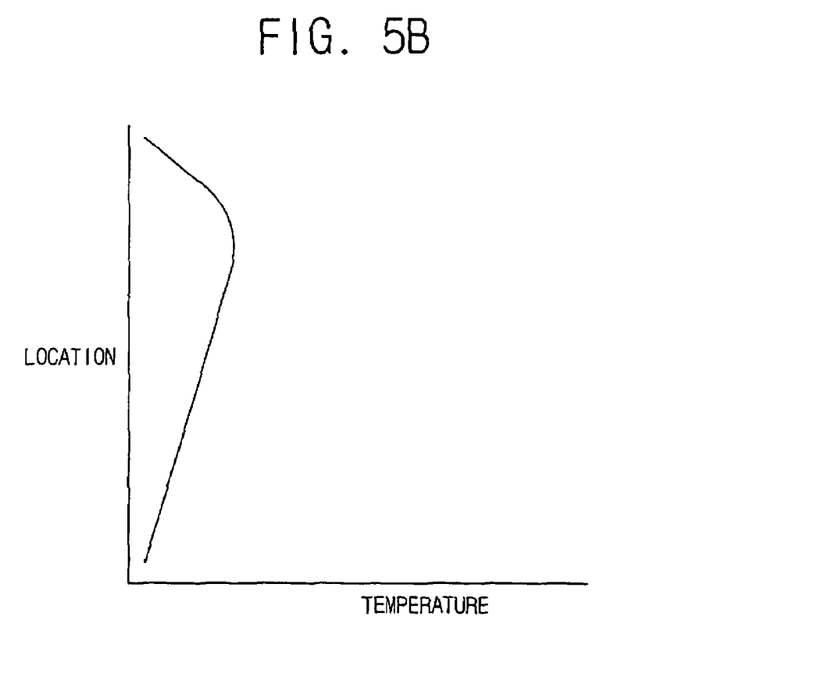
FIG. 5B is a graph of location versus temperature illustrating heat traveling to an upper part of the plate-type fluorescent lamp of FIGS. 4 and 5A.

Hereinafter, a second exemplary embodiment of the present invention will be described with reference to FIGS. 4 and 5. FIG. 4 is a plan view of the second exemplary embodiment of a plate-type fluorescent lamp according to the present invention. FIG. 5A is a cross-sectional view of the plate-type fluorescent lamp, taken along line V-V of FIG. 4. FIG. 5B is a graph of the location versus temperature illustrating heat traveling to an upper part of the plate-type fluorescent lamp of FIGS. 4 and 5A.

In the second exemplary embodiment, a dielectric layer 413 of a plate-type fluorescent lamp 40 is formed on a portion between an upper glass substrate 411 and an upper electrode 414. More specifically, the dielectric layer 413 is formed from an upper end portion of the upper electrode 414 toward a lower end portion thereof. Here, the upper end portion is adjacent to a driving PCB 28, which is disposed in an upper direction when an LCD 1 stands up. A length $l_1$ of the dielectric layer 413 is about 20% to about 40% of a length $l_2$ of the upper electrode 414 (FIG. 4).

The LCD 1 is generally used in a stand-position, in which the long sides of the LCD 1 are horizontally disposed, one over the other.

When the LCD 1 is driven, heat is generated in the plate-type fluorescent lamp 40. The heat travels to an upper part of the plate-type fluorescent lamp 40 by convection, thereby a spot which is about one-third from the top is the highest in temperature as shown in FIG. 5B. Accordingly, since the upper part of the upper substrate 410 rises in temperature the most, the temperature is efficiently controlled by forming the dielectric layer 413 on this high temperature spot to prevent generation of the pinhole.

Figure 6:
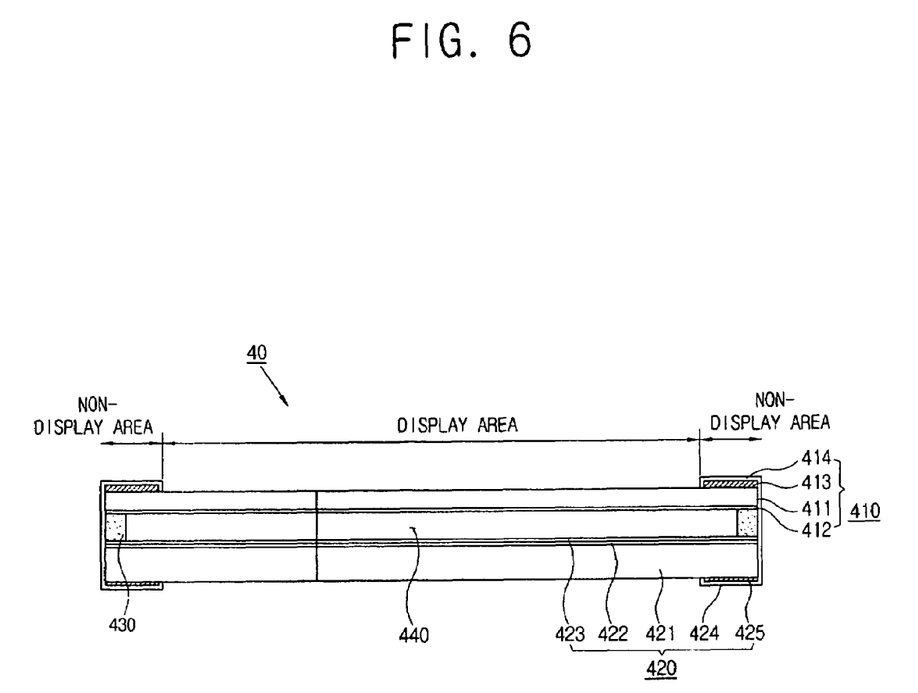
FIG. 6 is a cross-sectional view of a third exemplary embodiment of a plate-type fluorescent lamp according to the present invention.

FIG. 6 is a cross-sectional view of a third exemplary embodiment of a plate-type fluorescent lamp according to the present invention. In the third exemplary embodiment, a dielectric layer 425 is formed between a lower glass substrate 421 and a lower electrode 424, as well. However, the dielectric layer 425 of the lower substrate 420 is thinner than the dielectric layer 413 of an upper substrate 410, which is efficient like the first exemplary embodiment described above.

Figure 7:
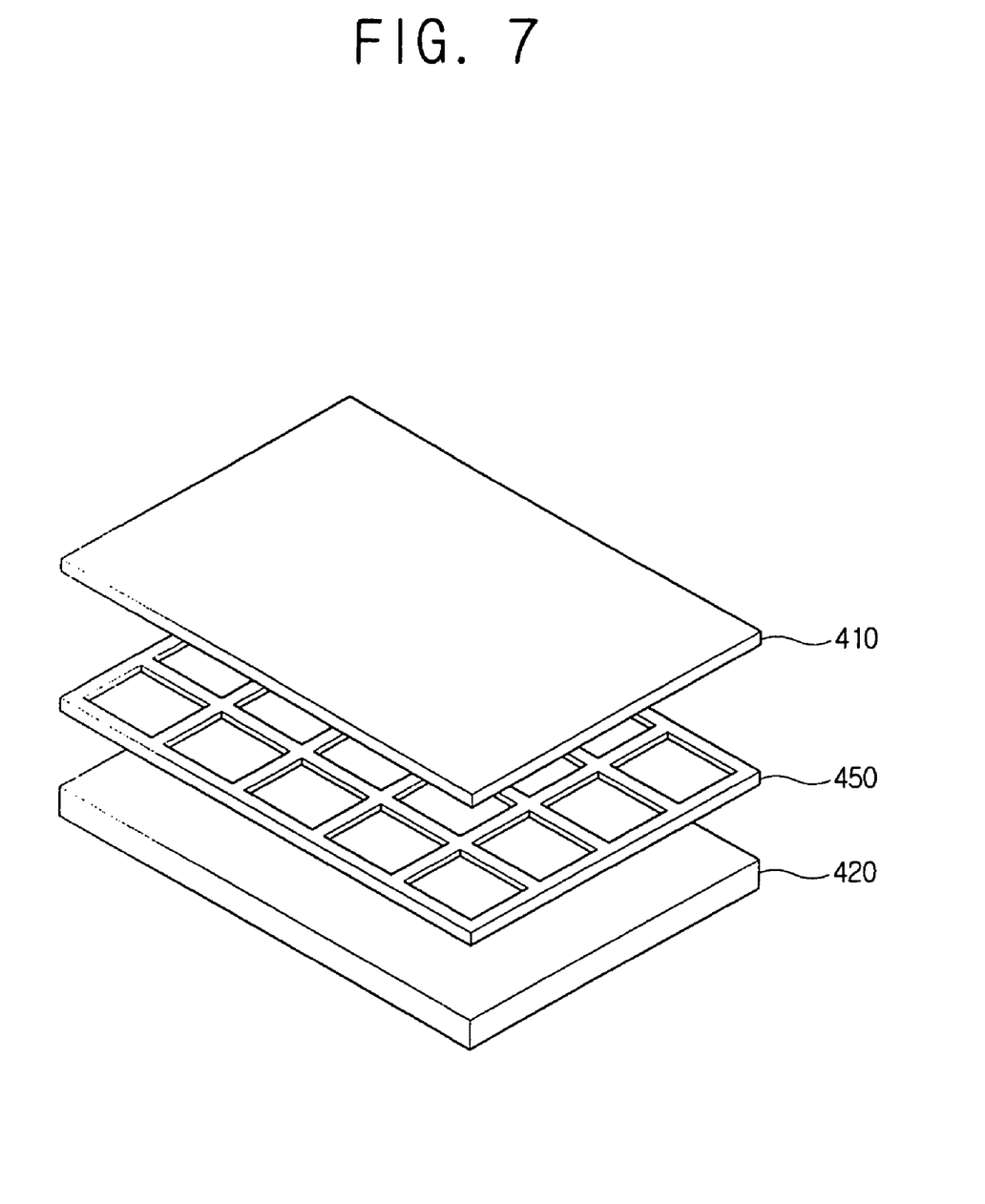
FIG. 7 is an exploded perspective view of a fourth exemplary embodiment of a plate-type fluorescent lamp according to the present invention.
Figure 8:
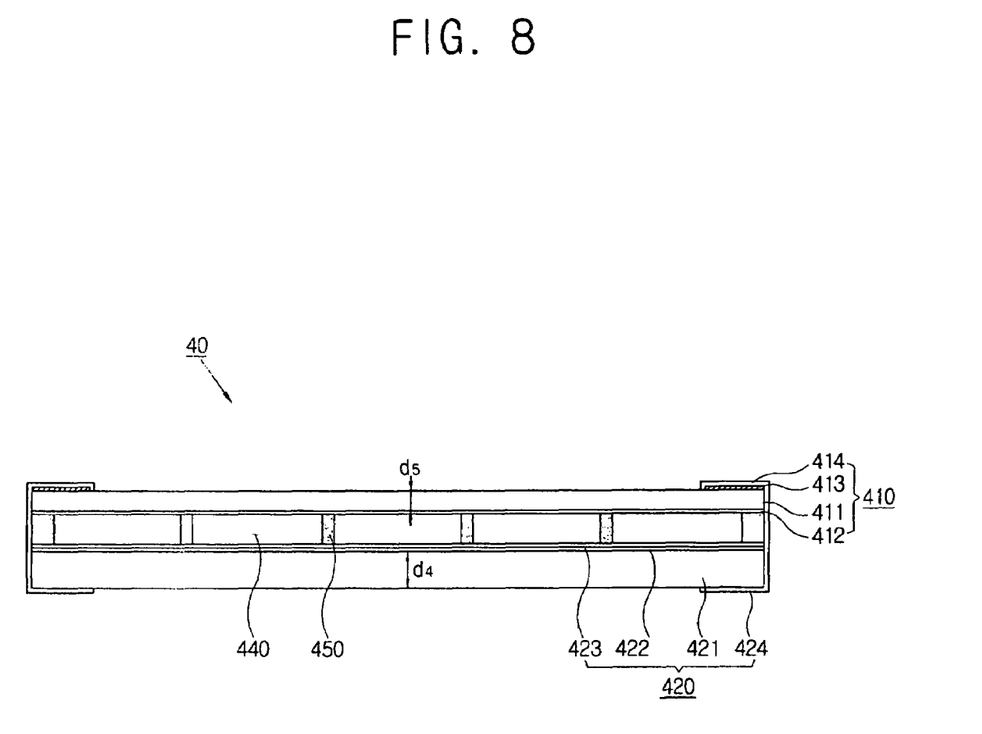
FIG. 8 is a cross-sectional view of the fourth exemplary embodiment of the plate-type fluorescent lamp of FIG. 7, according to the present invention.

FIG. 7 is an exploded perspective view of a fourth embodiment of a plate-type fluorescent lamp according to the present invention. FIG. 8 is a cross-sectional view of the fourth exemplary embodiment of the plate-type fluorescent lamp of FIG. 7, according to the present invention.

In the fourth exemplary embodiment, an upper glass substrate 411 is a plate-type like a lower glass substrate 421, only a thickness d5 of the upper glass substrate 411 is smaller than a thickness d4 of the lower glass substrate 421.

Between an upper substrate 410 and a lower substrate 420, a wall 450 is formed to form a light emitting space 440. The wall 450 is made of frit.

A dielectric layer 413 is formed between the upper glass substrate 411 and an upper electrode 414. The dielectric layer 413 is efficient like the first exemplary embodiment described above. According to the fourth exemplary embodiment, since the upper electrode 414 has the same area as the lower electrode 424, it is much easier for the current to concentrate in the upper substrate 410.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A plate-type fluorescent lamp including:
    an upper glass substrate;
    a lower glass substrate adhering opposite to the upper glass substrate;
    electrodes formed on external surfaces of the upper glass substrate and the lower glass substrate; and
    a dielectric layer formed between at least one of the upper and lower glass substrate and the electrodes.

2. The plate-type fluorescent lamp as set forth in claim 1, wherein the upper glass substrate is thinner than the lower glass substrate and the dielectric layer is formed between the upper glass substrate and the electrodes.

3. The plate-type fluorescent lamp as set forth in claim 1, wherein the dielectric layer comprises at least one selected from the group consisting of alumina, silica and frit.

4. The plate-type fluorescent lamp as set forth in claim 1, wherein a thickness of the dielectric layer is between about 15 μm and about 40 μm.

5. The plate-type fluorescent lamp as set forth in claim 1, wherein the upper glass substrate is shaped as a plurality of half cylinders disposed side by side.

6. The plate-type fluorescent lamp as set forth in claim 1, wherein the upper glass substrate is in a rectangular shape and the electrode is formed along opposing sides of the upper glass substrate.

7. The plate-type fluorescent lamp as set forth in claim 6, wherein the electrode is formed along shorter sides defining the upper glass substrate.

8. The plate-type fluorescent lamp as set forth in claim 6, wherein the dielectric layer extends from an end portion of the electrode to about 20% to about 40% of a length of the electrode.

9. The plate-type fluorescent lamp as set forth in claim 1, wherein the dielectric layer is formed by a spray method.

10. The plate-type fluorescent lamp as set forth in claim 1, wherein the upper glass substrate and the lower glass substrate are in a plate type, and the plate-type fluorescent lamp further includes a wall between the upper glass substrate and the lower glass substrate to maintain a distance therebetween.

11. The plate-type fluorescent lamp as set forth in claim 1, further including a light emitting gas sealed between the upper glass substrate and the lower glass substrate.

12. A display apparatus including:
    a display panel; and
    a plate-type fluorescent lamp including an upper glass substrate facing the display panel, a lower glass substrate adhering to the upper glass substrate, electrodes formed on external surfaces of the upper glass substrate and the lower glass substrate, and a dielectric layer formed between at least one of the upper and lower glass substrates and the electrodes.

13. The display device as set forth in claim 12, wherein the upper glass substrate is thinner than the lower glass substrate and the dielectric layer is formed between the upper glass substrate and the electrode.

14. The display device as set forth in claim 12, wherein the dielectric layer comprises at least one selected from the group consisting of alumina, silica and frit.

15. The display device as set forth in claim 12, wherein a thickness of the dielectric layer is between about 15 μm and about 40 μm.

16. The display device as set forth in claim 12, wherein the upper glass substrate is shaped as a plurality of half-cylinders disposed side by side.

17. The display device as set forth in claim 12, wherein the upper glass substrate is rectangularly shaped and the electrode is formed on opposing sides of the upper glass substrate facing each other.

18. The display device as set forth in claim 17, further including a driving PCB adhering to one side of the LCD panel, wherein the dielectric layer extends from an end portion of the electrode adjacent to the driving PCB to about 20% to about 40% of a length of the electrode.

\* \* \* \* \*